Figure 1:
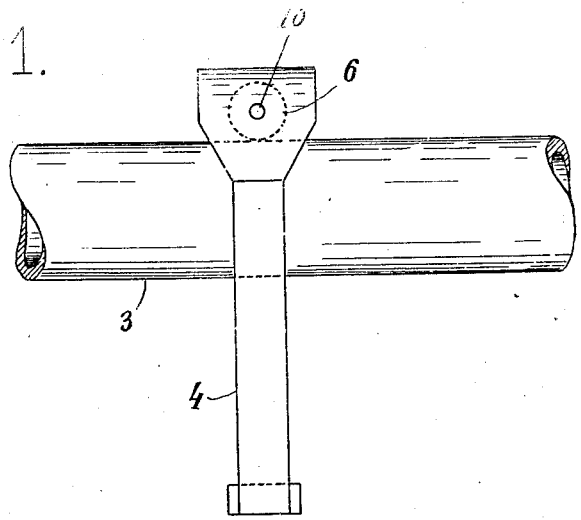

Patented Feb. 19, 1935

1,991,818

UNITED STATES PATENT OFFICE 1,991,818

CONVEYER HOOK FOR OVERHEAD PIPE-TRACKS AND THE LIKE

Johannes Sigfred Kønig Nissen, Copenhagen, Denmark

Application July 27, 1932, Serial No. 625,163
In Denmark July 29, 1931

1 Claim. (Cl. 105—150)

In slaughter-houses and in storage rooms for pig carcasses and the like, an overhead conveyer track is generally used in order to facilitate the transport of the carcasses to the various parts of the room. The carcasses are suspended in loops, which in their turn are attached to hooks engaging the track-rail itself.

Ordinarily the overhead track is a so-called pipe-track, the rail of which consists of a pipe well lubricated with grease or the like. The hook is generally made from a piece of wrought iron, the bottom part of which supports the loop in which the carcass is suspended, and the top part of which is shaped so as to fit the curvature of the pipe, so that the hook rests directly on the pipe. The transport itself is then effected in that the carcass is pulled or pushed by hand in the longitudinal direction of the pipe, so that the carcass will slide along the pipe.

In order to reduce the frictional resistance between the pipe-track and the conveyer hook, the latter may be fitted with a roll, by means of which it rests on the pipe, in such a manner that the hook does not slide, but rolls along the pipe.

The heretofore known conveyer hooks of this kind, however, suffer from the drawback that the roll is unprotected against the unavoidable concussions and blows, to which the hooks are exposed, as well as against dust and dirt. These hooks have therefore not been generally used in packing houses.

The present invention has for its object to remove these drawbacks in that the roll, in contradistinction to the heretofore known hooks, is built into the hook itself, so that the concussions and blows to which the hook is exposed will not be able to injure the roll itself.

One construction of the invention is shown on the drawing, which in

Fig. 1 shows the pipe and hook looking towards the pipe-track, and

Figure 2:
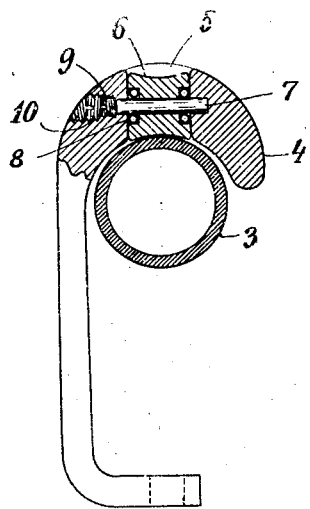

Fig. 2 a transverse section of the pipe-track and a portion of the hook.

3 is the pipe, on which the hook 4 is suspended. In the part of the hook that is situated above the pipe 3, a recess 5 is provided, in which a roll 6 is pivoted about a pin 7. In order to reduce the friction, ball-bearings 8 are inserted between the roll 6 and the pin 7. The pin 7 is fitted at one end with threads 9 corresponding to inside threads in the hook. In order to prevent the pin 7 from unscrewing itself, another screw 10 is provided opposite thereof, which screw has a slightly larger diameter than the threads 9, and is threaded in the opposite direction of the latter.

In the construction shown, the roll is wholly built into the hook, and it is therefore well protected against blows and other injury as well as against dust and dirt.

The present invention can be used not only in slaughter-houses but wherever pipe-tracks or the like are at hand, and the ordinary sliding hooks, or hooks with an unprotected roll in the hook, have heretofore been used.

I claim:

A conveyer hook for use on an overhead track of cylindrical cross section, comprising a vertical shank having a laterally extending substantially semi-circular, thickened arm at its upper end, for arrangement across the upper side of the track, said thickened arm having an opening extending vertically through its central thickened portion, and a roller arranged in said opening and mounted for rotation and bearing on the upper side of the track, the diameter of the roller being less than the vertical thickness of the said arm, and said roller being protected at its ends and sides by the walls of the said opening in said arm, so that when the hook falls from the track the roller is fully protected and prevented from striking any object.

JOHANNES SIGFRED KØNIG NISSEN.